United States Patent
Ljushev

(10) Patent No.: US 11,165,332 B2
(45) Date of Patent: Nov. 2, 2021

(54) DC-LINK CAPACITOR PROTECTION

(71) Applicant: Danfoss Power Electronics A/S, Gråsten (DK)

(72) Inventor: Petar Ljushev, Nordborg (DK)

(73) Assignee: Danfoss Power Electronics A/S, Gråsten (DK)

( * ) Notice: Subject to any disclaimer, the term of this patent is extended or adjusted under 35 U.S.C. 154(b) by 0 days.

(21) Appl. No.: 16/630,033

(22) PCT Filed: Jul. 14, 2017

(86) PCT No.: PCT/EP2017/067879
§ 371 (c)(1),
(2) Date: Jan. 10, 2020

(87) PCT Pub. No.: WO2019/011444
PCT Pub. Date: Jan. 17, 2019

(65) Prior Publication Data
US 2020/0403493 A1    Dec. 24, 2020

(51) Int. Cl.
*H02M 1/32* (2007.01)
*H02M 1/36* (2007.01)
*H02M 5/45* (2006.01)
*H02M 5/458* (2006.01)
*H02P 27/06* (2006.01)

(52) U.S. Cl.
CPC .............. *H02M 1/32* (2013.01); *H02M 1/36* (2013.01); *H02M 5/4505* (2013.01); *H02M 5/458* (2013.01); *H02P 27/06* (2013.01)

(58) Field of Classification Search
CPC ........ H02M 1/32; H02M 1/36; H02M 7/7575; H02M 5/44; H02M 5/453; H02M 5/458
See application file for complete search history.

(56) References Cited

U.S. PATENT DOCUMENTS

| 5,483,142 A | 1/1996 | Skibinski et al. | |
|---|---|---|---|
| 5,910,892 A * | 6/1999 | Lyons | H02M 7/487 363/98 |
| 6,031,738 A * | 2/2000 | Lipo | H02M 7/487 363/37 |
| 9,673,695 B1 * | 6/2017 | Li | H02M 1/36 |

(Continued)

FOREIGN PATENT DOCUMENTS

| CN | 201629719 U | 11/2010 |
|---|---|---|
| CN | 102097963 A | 6/2011 |

(Continued)

OTHER PUBLICATIONS

International Search Report for PCT Application No. PCT/EP2017/067879 dated Oct. 16, 2017.

*Primary Examiner* — Alex Torres-Rivera
(74) *Attorney, Agent, or Firm* — McCormick, Paulding & Huber PLLC

(57) ABSTRACT

The invention provides an inverter system and a method of using said inverter system. A rectifier stage of the inverter system is used to charge a DC link stage to a first voltage level and a control module determines whether voltages over series connected capacitors of the DC link stage are balanced. If those voltages are balanced, the rectifier stage charges the DC link stage to a second voltage level higher than the first voltage level.

20 Claims, 4 Drawing Sheets

(56) References Cited

U.S. PATENT DOCUMENTS

| | | | | |
|---|---|---|---|---|
| 2004/0080165 | A1* | 4/2004 | Geis | F02C 6/14 |
| | | | | 290/52 |
| 2008/0304298 | A1* | 12/2008 | Toba | H02M 1/32 |
| | | | | 363/56.01 |
| 2009/0059625 | A1* | 3/2009 | Viitanen | H02M 5/458 |
| | | | | 363/36 |
| 2010/0321965 | A1* | 12/2010 | Sakakibara | H02M 5/4585 |
| | | | | 363/37 |
| 2011/0038185 | A1* | 2/2011 | Swamy | H02M 5/458 |
| | | | | 363/34 |
| 2014/0313789 | A1* | 10/2014 | Dujic | H02M 3/33507 |
| | | | | 363/21.01 |
| 2017/0302159 | A1* | 10/2017 | Green | H02P 27/06 |

FOREIGN PATENT DOCUMENTS

| | | | |
|---|---|---|---|
| CN | 102801383 | A | 11/2012 |
| CN | 103888004 | A | 6/2014 |
| CN | 104734528 | A | 6/2015 |
| EP | 1519465 | A1 | 3/2005 |
| EP | 1538733 | A2 | 6/2005 |
| EP | 3068023 | A1 | 9/2016 |

* cited by examiner

DC-LINK CAPACITOR PROTECTION

CROSS-REFERENCE TO RELATED APPLICATIONS

This application is a National Stage application of International Patent Application No. PCT/EP2017/067879, filed on Jul. 14, 2017, which is hereby incorporated by reference in its entirety.

TECHNICAL FIELD

The present invention relates to protection of DC-link capacitors, for example for use in inverters (such as motor drives).

BACKGROUND

Inverters typically comprise a number of switches (often IGBTs) that are used to switch the DC voltage stored across one or more DC link capacitors under the control of a controller in order to generate an AC signal for provision to a load (such as a motor). The load may have multiple phases (3 phases are often provided).

The DC voltage stored across such DC link capacitors can be high: values of the order of 800 to 900 volts are common. It can be difficult (and expensive) to provide a single capacitor that can withstand such a high voltage; hence a series connection of two (or more) capacitors is common.

A fault can occur with one of the DC link capacitors that causes the capacitor to short-circuit. Such a fault results in the entire DC link voltage appearing across a single capacitor. Providing such a high voltage across a single capacitor can lead to that capacitor being damaged, perhaps catastrophically. Fires and explosions can be caused in such a scenario.

The present invention seeks to address at least some of the problems outlined above.

SUMMARY

The present invention provides a method of operating an inverter system, the inverter system comprising a rectifier stage, a DC link stage, an inverter stage and a control module, the method comprising: using the rectifier stage to charge the DC link stage to a first (relatively low) voltage level; activating the control module; using the control module to determine whether voltages over series connected capacitors of the DC link stage are balanced (e.g. the same to within an acceptable tolerance); and in the event that the control module determines that said voltages are balanced, using the rectifier stage to charge the DC link stage to a second voltage level, wherein the second voltage level is higher than the first voltage level (thereby overcoming the problem of protection the DC-link capacitors during a start-up phase in which the DC link voltage is difficult to measure).

In the event that the control module determines that said voltages are not balanced, the rectifier stage may be controlled such that said DC link voltage is limited, e.g. limited to said first voltage level or perhaps a lower voltage (even zero). This step may be implemented by suitably controlling thyristors of said rectifier stage in embodiments in which an active rectifier comprises thyristors. Alternatively, or in addition, in the event that the control module determines that said voltages are not balanced, the control module may be used to raise an alarm.

The present invention also provides an inverter system comprising a rectifier stage, a DC link stage, an inverter stage and a control module, wherein: the rectifier stage is configured to charge the DC link stage to a first (relatively low) voltage level; the DC link stage comprises two or more series connected capacitors; the control module is configured to determine whether voltages over the series connected capacitors of the DC link stage are balanced; and the rectifier is configured to charge the DC link stage to a second voltage level (higher than the first) under the control of said control module, in the event that the control module determines that voltages over series connected capacitors of the DC link stage are balanced.

The rectifier stage may include a charging circuit (such as an active inrush circuit) to control the charging of the DC link stage to the first and/or the second voltage levels. The charging circuit is generally referred to in this document as an active inrush circuit but alternative terms will be apparent to the person skilled in the art, such as a soft-charger circuit or a pre-charger circuit.

In some forms of the invention, the first voltage level is a level that can be safely withstood by the series connected DC link capacitors in the event of a short circuit to one of said DC link capacitors. (In this case, the remaining DC link capacitors may be a single DC link capacitor.)

The first voltage level is typically sufficient to start a main switched mode power supply. (The inverter system may include said switched mode power supply.) The main switched mode power supply may be used to provide power to the control module. The main switched mode power supply may have an input receiving power from said DC link stage.

In one form of the invention, the first voltage level is between 250 and 300 volts.

The rectifier stage may include one or more thyristors, such that the rectifier is an active rectifier. The rectifier may include series connected thyristors. In an alternative arrangement, the rectifier may include series connections of thyristors and diodes.

The present invention yet further provides a computer program (or a computer program product) configured to: charge a DC link stage of an inverter system to a first voltage level; determine whether voltages over series connected capacitors of the DC link stage are balanced; and in the event that the control module determines that said voltages are balanced, charge the DC link stage to a second voltage level, wherein the second voltage level is higher than the first voltage level. In the event that the said voltages are not balanced, the computer program (or computer program product) may limit the DC link voltage (e.g. to said first voltage level or perhaps a lower voltage (even zero)) and/or raise an alarm.

BRIEF DESCRIPTION OF THE DRAWINGS

The invention will now be described in further detail with reference to the following schematic drawings, in which.

DETAILED DESCRIPTION

Figure 1:
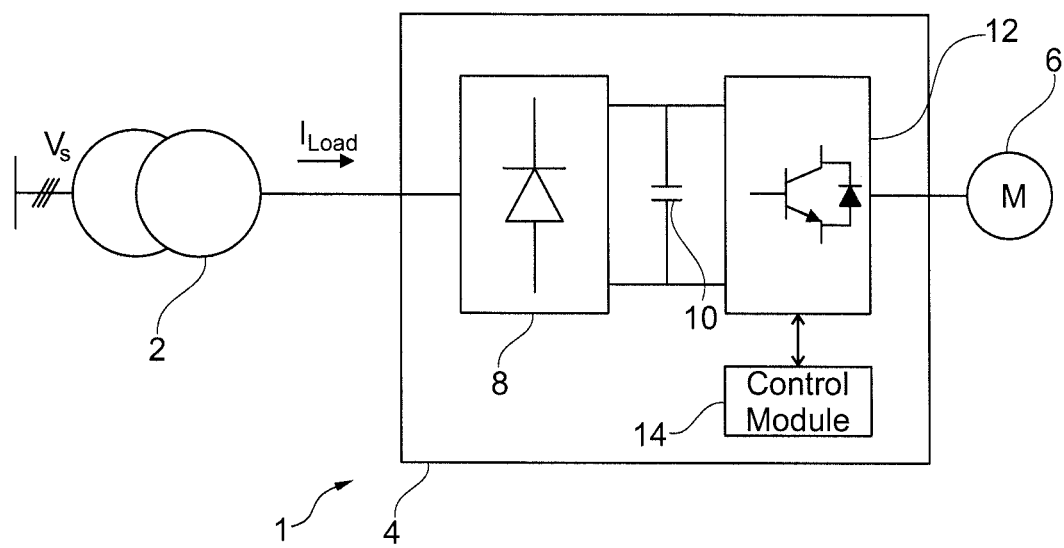
FIG. 1 shows an inverter drive system.

FIG. 1 is a block diagram of a system, indicated generally by the reference numeral 1, including an adjustable speed drive (ASD). The system 1 comprises an AC power supply 2, an ASD 4 and a load 6 (such as a three-phase motor). The ASD 4 includes a rectifier 8, a DC link capacitor 10, an inverter 12 and a control module 14.

The output of the AC power source 2 is connected to the input of the rectifier 8. The output of the rectifier 8 provides DC power to the inverter 12. As described further below, the inverter 12 includes a switching module used to convert the DC voltage into an AC voltage having a frequency and phase dependent on gate control signals. The gate control signals are typically provided by the control module 14. In this way, the frequency and phase of each input to the load 6 can be controlled.

The inverter 12 is typically in two-way communication with the control module 14. The inverter 12 may monitor currents and voltages in each of the three connections to the load 6 (assuming a three-phase load is being driven) and may provide current and voltage data to the control module 14 (although the use of both current and voltage sensors is by no means essential). The control module 14 may make use of the current and/or voltage data (where available) when generating the gate control signals required to operate the load as desired. Of course, other control arrangements also exist, some of which do not require current or voltage data to be provided.

Figure 2:
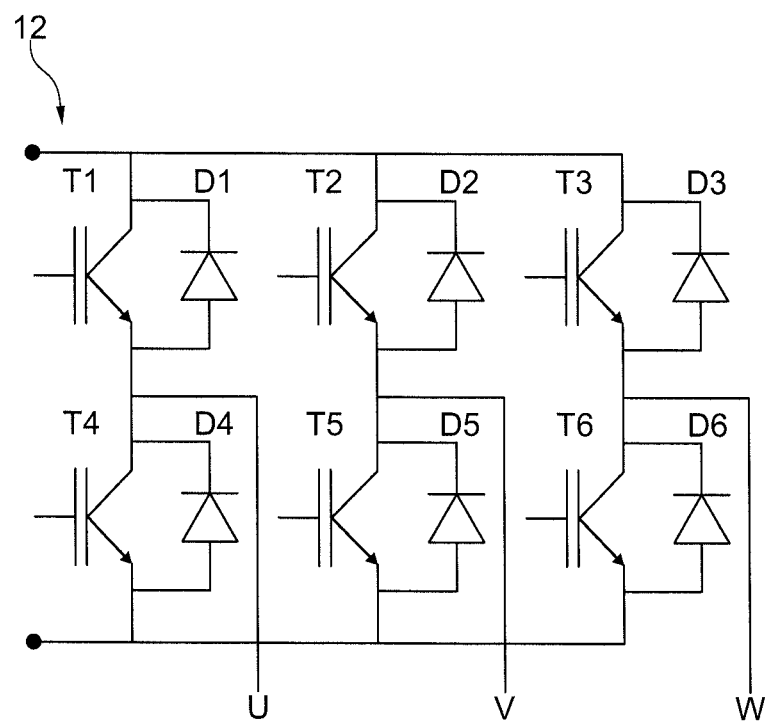
FIG. 2 shows an inverter that may be used in the inverter drive system of FIG. 1.

FIG. 2 shows details of an exemplary implementation of the inverter 12.

As shown in FIG. 2, the inverter 12 comprises first, second and third high-sided switching elements (T1, T2 and T3) and first, second and third low-sided switching elements (T4, T5 and T6). Each switching element may, for example, be an insulated-gate bipolar transistor (IGBT) or a MOSFET transistor. As shown in FIG. 2, each of the switching elements (T1 to T6) is associated with a corresponding free-wheeling diode (D1 to D6).

The exemplary inverter 12 is a three-phase inverter generating three outputs: U, V and W. The three phases of the inverter 12 provide inputs to the three-phases of the load 6 in the system 1 described above. Of course, the inverter 12 could be modified to provide a different number of outputs in order to drive a different load (such as a load with more or fewer than three phases).

The first high-sided switching element T1 and the first low-sided switching element T4 are connected together between the positive and negative DC terminals. The mid-point of those switching elements provides the U-phase output. In a similar manner, the second high-sided switching element T2 and the second low-sided switching element T5 are connected together between the positive and negative DC terminals with the mid-point of those switching elements providing the V-phase output. Furthermore, the third high-sided switching element T3 and the third low-sided switching element T6 are connected together between the positive and negative DC terminals with the mid-point of those switching elements providing the W-phase output.

The inverter 12 is a 2-level, 6-transistor inverter. As will be apparent to those skilled in the art, the principles of the present invention are applicable to different inverters, such as 3-level inverters. The description of the inverter 12 is provided by way of example to help illustrate the principles of the present invention.

Figure 3:
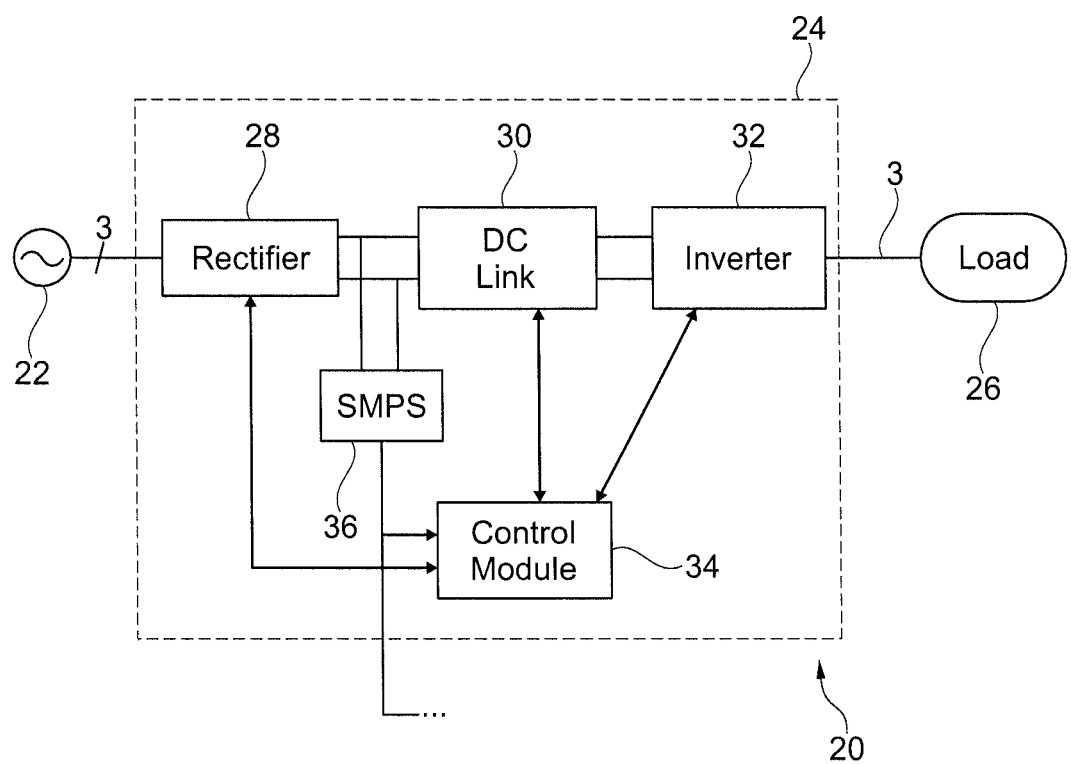
FIG. 3 shows a highly schematic inverter drive system in accordance with an aspect of the present invention.

FIG. 3 shows a highly schematic inverter drive system, indicated generally by the reference numeral 20, in accordance with an aspect of the present invention. As will become clear from the description below, the inverter drive system 20 includes a number of similarities with the inverter drive system 1 described above with reference to FIG. 1.

The system 20 comprises an AC power supply 22, an ASD 24 and a load 26 (such as a three-phase motor). The ASD 24 includes a rectifier stage 28, a DC link stage 30, an inverter stage 32, a control module 34 and a switched mode power supply (SMPS) 36.

The output of the AC power source 22 is connected to the input of the rectifier 28. The output of the rectifier 28 provides DC power to the DC link stage 30 under the control of the control module 34. As is described in detail below, the rectifier stage 28 is controllable such that the DC link voltage is controllable and is therefore typically referred to as an active rectifier (to distinguish it from a traditional passive diode rectifier).

As shown in FIG. 3, the output of the rectifier 28 also provides a DC voltage to the input of the switched mode power supply (SMPS) 36. The switched mode power supply provides power to the control module 34 and can also be used to provide power to other circuit elements (not shown in FIG. 3).

The inverter 32 is typically in two-way communication with the control module 34. The inverter 32 may monitor currents and voltages in each of the three connections to the load 26 (assuming a three-phase load is being driven) and may provide current and voltage data to the control module 34 (although the use of both current and voltage sensors is by no means essential). The control module 34 may make use of the current and/or voltage data (where available) when generating the gate control signals required to operate the load as desired. Of course, other control arrangements also exist, some of which do not require current or voltage data to be provided.

Although the system 20 is used to drive a load, such as a motor, this is not essential to the invention. For example, the principles of the present invention are applicable for use in grid-connected inverters such as solar inverters or wind inverters.

Figure 4:
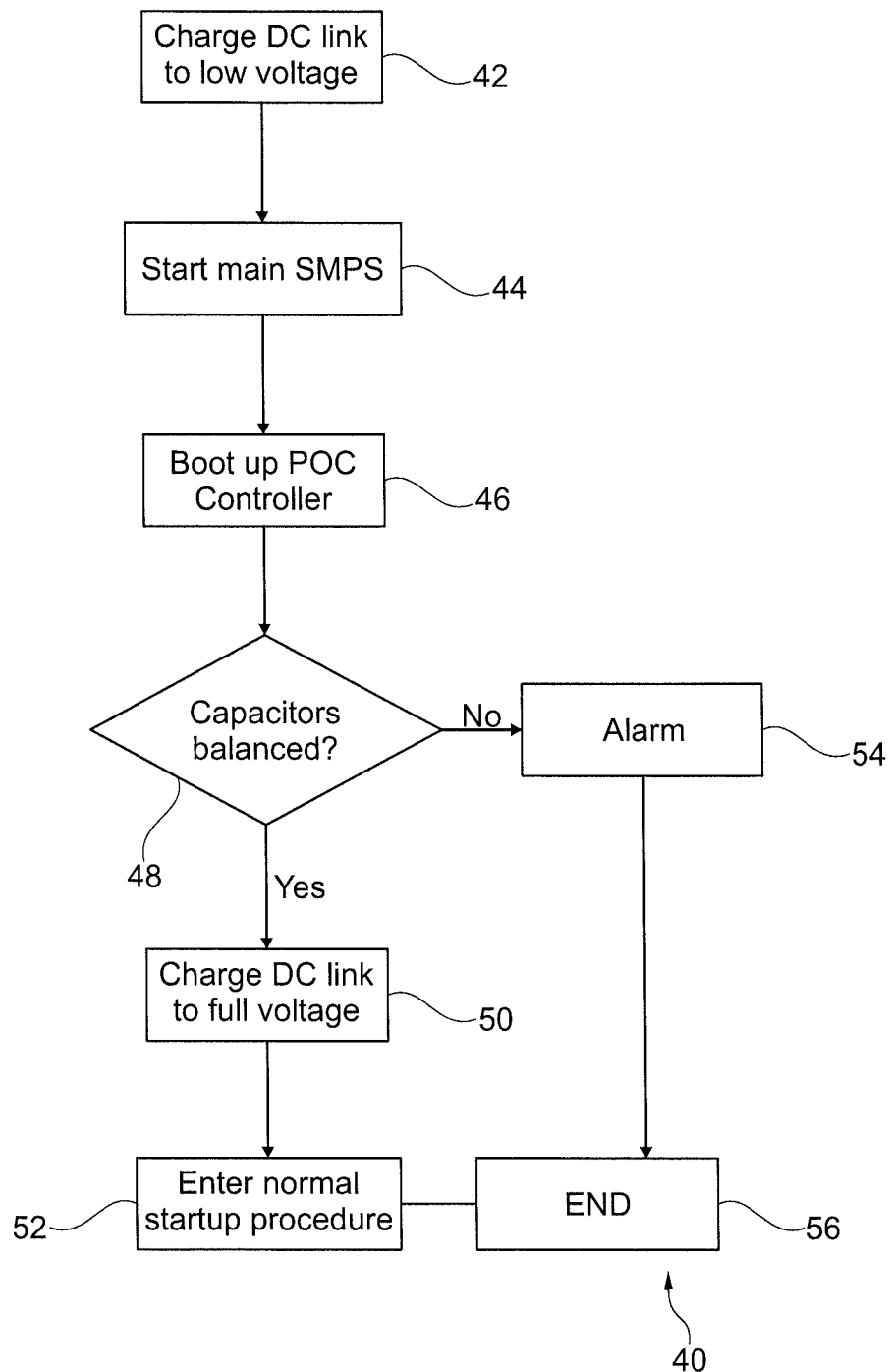
FIG. 4 is a flow chart demonstrating an exemplary use of the system of FIG. 3.

FIG. 4 is a flow chart showing an algorithm, indicated generally by the reference numeral 40, demonstrating an exemplary use of the inverter drive system 20.

The algorithm 40 starts at step 42, where the rectifier stage 28 is used to charge the DC link stage 30 to a first (low) voltage.

Next, at step 44, the main SMPS circuit 36 is started. Thus, the voltage output by rectifier stage 28 in the step 42 must be sufficient to enable the SMPS circuit 36 to function. In one implementation of the invention, that voltage is of the order of 250-300 voltage. It should be noted that this voltage is sufficiently low that it can generally be handled by a single DC link capacitor (that might typically have a breakdown voltage of the order of 400 to 450 volts).

The algorithm 40 then moves to step 46 where the control module 34 is turned on. In order for the control module 34 to be turned on, the main SMPS circuit 36 needs to be outputting a sufficient voltage. It should be noted that the control module is sometimes referred to as a "power oriented controller" (or POC), hence the use if the term "boot up POC controller" in FIG. 3, which refers to the turning on of the control module 34.

The control module 34 receives data concerning the voltage across the series connected capacitors of the DC link stage 30. Thus, at step 48 of the algorithm 40, the control module can determine whether the voltages across the series connected DC link capacitors are balanced. If these voltages are deemed to be balanced, then the algorithm 40 moves to step 50. If not (for example, due to a capacitor short-circuit), the algorithm 40 moves to step 54. By way of example, the voltages across the DC link capacitors may be deemed to be "balanced" if they are the same or within an acceptable tolerance (e.g. the same to within a defined number of volts or to within a defined percentage).

At step 50, the rectifier 28 is used to charge the DC link voltage to a second, higher level. This second higher level is the normal operating level of the system 20 (and may be the "full voltage" as suggested in FIG. 4). Given that the control module 34 has by this stage determined (in step 48) that the DC link stage does not include a capacitor short-circuit, it has been determined that it is safe for the system to operate with this second, higher, DC link voltage level.

With the DC link voltage set to the second (higher, normal, operating level), then a usual start-up procedure is initiated at step 52 of the algorithm 40 and the algorithm 40 then terminates at step 56.

At step 54, it has been determined that the voltages across the DC link capacitors are not balanced. Thus, a fault may have occurred (such as a short-circuit). At step 54, an alarm is raised before the algorithm terminates at step 56. Note that the second, higher DC link voltage (which might cause a DC link capacitor explosion) is not used. In the step 54, the rectifier 28 is typically controlled to restrict the DC link voltage to safe levels. For example, the rectifier stage may be controlled such that said DC link voltage is limited to said first voltage level, but a different (lower) voltage level might be used (even zero). This step may be implemented by suitable controlling thyristors of said rectifier stage in embodiments of the invention in which the rectifier stage 28 comprises thyristors.

It is important to note that the step 48 (in which it is determined whether the DC link capacitors are balanced) cannot be conducted until the control module 34 is operational. The control module 34 cannot be operational until the main SMPS circuit 36 is outputting a sufficient voltage. Thus, when the system 20 is first connected to the mains power supply 22, there is a delay before it can be determined whether or not any of the series connected capacitors of the DC link stage 30 are short-circuited.

Thus, in a start-up situation, the rectifier 28 is used to charge the DC-link to a low voltage (step 42 of the algorithm 40) which is sufficient to start the SMPS circuit 36 and subsequently boot up the control module 34, which control module can measure the voltage balance of the capacitors in the DC-bus. If the voltages are balanced between the capacitors, the control module gives a command for the DC-link voltage to be charged to a normal operating voltage. In a case of excessive imbalance, meaning, for example, that one of the capacitors is damaged or short-circuited, the control module 34 will prevent the charging of the DC-link and will log an alarm in the log and report the fault to the user, for example via Industrial Control Panel (ICP).

Figure 5:
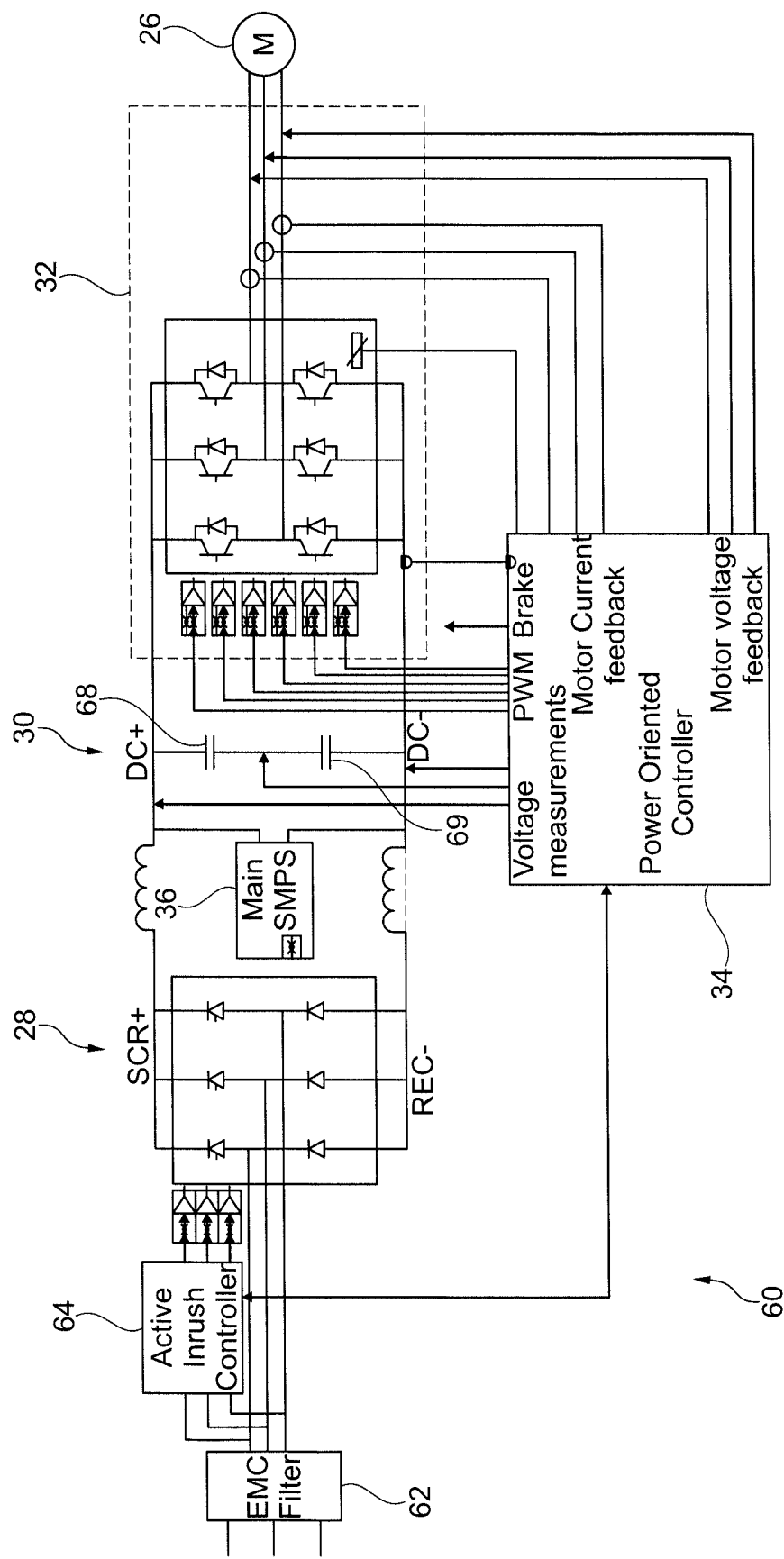
FIG. 5 shows an exemplary implementation of the inverter drive system of FIG. 3.

FIG. 5 provides further detail of an exemplary implementation, indicated generally by the reference numeral 60, of the inverter drive system of FIG. 3.

The inverter drive system 60 shown in FIG. 5 includes the load 26, rectifier stage 28, the DC link stage 30, the inverter stage 32, the control module 34 and the switched mode power supply (SMPS) 36 of the inverter system 20 described above. In addition, the inverter drive system 60 includes an EMC filter 62 and an active inrush controller (AIC) 64. As shown in FIG. 5, the DC link stage 30 includes a series connection of DC link capacitors 68 and 69.

In the inverter drive system 60, the control module 34 receives motor current feedback and motor voltage feedback from the output of the inverter stage 32. These feedback signals are provided by way of example only. The skilled person would be aware that alternative or additional feedback signals may be provided in the normal operation of the inverter drive system 60.

As shown in FIG. 5, the control module 34 also receives voltage measurements from the DC link stage 30, specifically the DC+ and DC− voltages of the DC link and from the mid-point of the series connected DC link capacitors 68 and 69. Comparing these voltages gives one method of determining whether there is a short-circuit (or some other fault) with one or more of the series connected DC link capacitors. Other methods include comparing the voltage at the mid-point of the DC link capacitors with the mid-point of a pair of series connected resistors that are provided in parallel with the DC link capacitors. The skilled person will be aware of further alternatives.

As described herein, the rectifier stage 28 is controllable. For example, the rectifier stage may include thyristors or series combinations of thyristors and diodes. (The system 60 shown in FIG. 5 includes series combinations of thyristors and diodes, but this is not essential to all forms of the invention.)

When the DC-link consists of at least two capacitors provided in series (such as the capacitors 68 and 69 shown in FIG. 5), it is typically the intention that these capacitors share the voltage on the DC-link approximately equally since they are not designed to sustain the full DC-link voltage during normal operation of the drive on their own i.e. individually. A problem arises when failure in the isolation/dielectric of one capacitor leads to an internal short circuit which results in a situation where the other healthy capacitors get significant overvoltage during operation which can create catastrophic damage and explosion of the otherwise healthy components. In electrical motor drives where the input rectifier section is controllable because of the use of thyristors, it is possible to prevent healthy capacitor damage and explosion by stopping the flow of grid current into the faulty DC-link, thus reducing the power dissipation to reasonable levels. This can be done by stopping the thyristor gate pulses by the Active Inrush Controller (AIC) 64 in the case when large imbalance is observed between the voltages of the DC-link capacitors. Monitoring of the voltages of the individual capacitors in the DC-link is performed by the control module 34 during normal drive operation and the explosion prevention can be initiated by commanding the AIC 64 to inhibit thyristor gate pulses. This works when the complete drive is already started up. During drive start-up, only the AIC 64 is active and the control module 34 is not yet active, so charging the DC-bus to full voltage when one of the capacitors is already shorted will lead to significant overvoltage on the rest of the capacitors and potentially to an explosion. The main SMPS 36 which is supplying the control module 34 has a finite start-up time and control module 34 also needs some time to boot-up.

In the system 60, the active inrush controller 64 (i.e. the thyristors in the rectifier stage) are used in the start-up situation to charge the DC-link only to a voltage level which can be safely handled by a single capacitor in the DC-link (see step 42 of the algorithm 40 described above). Once the main SMPS 36 and control module 34 have started (steps 44 and 46 of the algorithm 40), voltage imbalance between the capacitors in the DC-link can be measured (step 48 of the algorithm 40) and charging of the DC-link is either continued (step 50) or interrupted in case of large imbalance (step 54). It should be noted that the use of an active inrush circuit is not essential to all forms of the invention. Similar circuitry (such as pre-charger or soft-charger circuits) may be used. Such circuits can be described by the general term "charging circuits".

The embodiments of the invention described above are provided by way of example only. The skilled person will be aware of many modifications, changes and substitutions that could be made without departing from the scope of the present invention. For example, the principles of the present invention are not limited to use with a motor drive system of the form shown in FIG. 1. The claims of the present invention are intended to cover all such modifications, changes and substitutions as fall within the spirit and scope of the invention.

The invention claimed is:

1. A method of operating an inverter system, the inverter system comprising a rectifier stage, a DC link stage, an inverter stage and a control module, the method comprising:
   using the rectifier stage to charge the DC link stage to a first voltage level;
   activating the control module;
   using the control module to determine whether voltages over series connected capacitors of the DC link stage are balanced; and
   in response to the event that the control module determines that said voltages are balanced, using the rectifier stage to charge the DC link stage to a second voltage level, wherein the second voltage level is higher than the first voltage level.

2. The method as claimed in claim 1, wherein the rectifier stage includes a charging circuit, the method further comprising using said charging circuit to control the charging of the DC link stage to the first and/or the second voltage levels.

3. The method as claimed in claim 2, wherein the first voltage level is a level that can be safely withstood by the series connected DC link capacitors in the event of a short circuit to one of said DC link capacitors.

4. The method as claimed in claim 2, wherein the first voltage level is sufficient to start a main switched mode power supply.

5. The method as claimed in claim 1, wherein the first voltage level is a level that can be safely withstood by the series connected DC link capacitors in the event of a short circuit to one of said DC link capacitors.

6. The method as claimed in claim 5, wherein the first voltage level is sufficient to start a main switched mode power supply.

7. The method as claimed in claim 1, wherein the first voltage level is sufficient to start a main switched mode power supply.

8. The method as claimed in claim 7, wherein the main switched mode power supply is used to provide power to the control module.

9. The method as claimed in claim 7, wherein the main switched mode power supply has an input receiving power from said DC link stage.

10. The method as claimed in claim 1, wherein the first voltage level is between 250 and 300 volts.

11. The method as claimed in claim 1, wherein, in the event that the control module determines that said voltages are not balanced, the rectifier stage is controlled such that said DC link voltage is limited.

12. The method as claimed in claim 1, wherein, in the event that the control module determines that said voltages are not balanced, the control module is used to raise an alarm.

13. An inverter system comprising a rectifier stage, a DC link stage, an inverter stage and a control module, wherein:
    the rectifier stage is configured to charge the DC link stage to a first voltage level;
    the DC link stage comprises two or more series connected capacitors;
    the control module is configured to determine whether voltages over the series connected capacitors of the DC link stage are balanced; and
    the rectifier is configured to charge the DC link stage to a second voltage level under the control of said control module, in response to the event that the control module determines that voltages over series connected capacitors of the DC link stage are balanced.

14. The inverter system as claimed in claim 13, wherein the rectifier stage includes one or more thyristors.

15. The inverter system as claimed in claim 13, further comprising a main switch mode power supply.

16. The inverter system as claimed in claim 15, wherein the main switch mode power supply receives power from the DC link stage of the inverter system.

17. The inverter system as claimed in claim 13, wherein the rectifier stage includes a charging circuit to control the charging of the DC link stage to the first and/or the second voltage levels.

18. The inverter system as claimed in claim 13, wherein, in the event that the control module determines that said voltages are not balanced, the rectifier stage is controlled such that said DC link voltage is limited.

19. The inverter system as claimed in claim 13, wherein, in the event that the control module determines that said voltages are not balanced, the control module is used to raise an alarm.

20. A computer program product configured to:
    charge a DC link stage of an inverter system to a first voltage level;
    determine whether voltages over series connected capacitors of the DC link stage are balanced; and
    in response to the event that the control module determines that said voltages are balanced, charge the DC link stage to a second voltage level, wherein the second voltage level is higher than the first voltage level.

* * * * *